358-69. OR 2,752,418 SR
SEARCH ROOM

June 26, 1956 R. G. CLAPP 2,752,418

COLOR TELEVISION INDEXING SYSTEM

Filed Nov. 3, 1953 5 Sheets-Sheet 1

INVENTOR.
RICHARD G. CLAPP
BY
Brown, Denk & Synnestvedt
AGENTS

June 26, 1956 R. G. CLAPP 2,752,418

COLOR TELEVISION INDEXING SYSTEM

Filed Nov. 3, 1953 5 Sheets-Sheet 2

INVENTOR.
RICHARD G. CLAPP
BY
Brown, Denk & Synnestvedt
AGENTS

COLOR TELEVISION INDEXING SYSTEM

Filed Nov. 3, 1953 5 Sheets-Sheet 3

INVENTOR.
RICHARD G. CLAPP
BY
Brown, Denk, & Synnestvedt
AGENTS

INVENTOR.
RICHARD G. CLAPP
BY
Brown, Denk & Synnestvedt
AGENTS

June 26, 1956 R. G. CLAPP 2,752,418

COLOR TELEVISION INDEXING SYSTEM

Filed Nov. 3, 1953 5 Sheets-Sheet 5

INVENTOR.
RICHARD G. CLAPP
BY
Brown, Denk, & Synnestvedt
AGENTS

United States Patent Office 2,752,418

Patented June 26, 1956

2,752,418

COLOR TELEVISION INDEXING SYSTEM

Richard G. Clapp, Narberth, Pa., assignor to Philco Corporation, Philadelphia, Pa., a corporation of Pennsylvania Application November 3, 1953, Serial No. 390,062

18 Claims. (Cl. 178—5.4)

This invention relates to color television systems. More particularly the invention is described in connection with systems employing cathode ray picture tubes with stripes of different phosphor materials at different elemental screen positions for producing respectively light of primary colors red, green and blue in response to impingement of the cathode ray beam.

In systems of this type, having vertically oriented color phosphor triplets, the beam is scanned at a nearly constant speed across the screen to impinge upon red, green and blue stripes in a periodic sequence. As different colored light emissive phosphor stripes are successively impinged thereby, the beam is modulated in intensity in the same periodic sequence by corresponding video color signals. Because the color of the reproduced light is dependent solely upon the position of the beam, any instantaneous variation of the scanning speed will result in a change of beam position causing light production of a color different from that represented by the video signals with which the beam is modulated. Even a small percentage of scanning variation results in a large amount of color distortion, because of the close spacing of the elemental color stripes which must be so fine that the eye does not resolve the separate colors but merges the entire display into a continuous color scene. Even if scanning speed irregularities could be eliminated, the original placement of such fine phosphor stripes would have to be performed with great precision over the entire screen to cause a periodically recurring color pattern matching that of the video color signal sequence. Such conditions are so stringent however that it is in some cases convenient to provide color indexing circuits in these television systems to correct any color distortion caused when the beam is not modulated by video signals of the same color being reproduced. These systems either may select the proper video color signal in response to the reproduced color on the screen or may deflect the beam to a color stripe corresponding to the video signal currently modulating the beam.

The position of the beam has been detected in prior art indexing systems by means of indexing stripes specially placed with reference to the color phosphors to indicate the position of the beam upon the screen. Should the indexing stripes for any reason not be aligned exactly with the color phosphor stripes, the beam position information would not properly indicate the color being reproduced at all screen positions. Therefore it is preferable to detect the color of reproduced light directly from the screen by means of a photoelectric cell sensitive to light of a particular color. However, the light from the screen is intensity modulated with video intelligence so that the photocell output signals include the picture luminance variations. To keep the video signals from interfering with the indexing function, the system described in the copending application of D. Sunstein, Serial No. 185,106, filed September 15, 1950, was proposed. The periodic recurrence component of the detected light of a particular color is compared in phase with a reference oscillator signal. The reference oscillator signal synchronously drives a switching circuit which, in this system, selects the video color modulation in a predetermined color sequence. Any phase variations, between the reference oscillator and detected light signals, indicate departures from the proper color presentation. The variations of phase therefore are used in a servo correction loop for automatic phase control of the oscillator. The phase responsive indexing system operates independent of the amplitude of the light caused by the video intensity modulation.

Although this control action is basically desirable, the indexing signals which the photocell detects are of low amplitude. These require amplification before use in a broad-band, high-frequency amplifier circuit. For example, the frequency for the periodic recurrence of a single color is of the order of seven megacycles per second when produced from a color tube having 450 vertically oriented color triplets of red, green and blue stripes horizontally scanned at constant speed with a repetition rate of 15,750 cycles per second. It is, however, desirable to effect control for all three reproduced colors. With the combined correction signal derived from photo detectors for the three colors, the frequency becomes 21 megacycles per second. Therefore a five percent variation in the horizontal scanning speed will change the color reproduction recurrence frequency component by more than one megacycle per second. Since the variation may be in either sense, the control circuits must be responsive to a band of frequencies two megacycles wide at the basic frequency of 21 megacycles in the simplest possible system utilizing only the fundamental frequency components. The bandwidth must be greater if sideband energy is also required. Wide band amplifiers suitable for such signals have little gain, and are susceptible to noise.

In addition, it is difficult to design such amplifiers with a constant phase shift for all frequency components contained in the band to which the control circuit is responsive. Therefore phase variations in the amplifier circuit may be reproduced by the correction system to cause indexing errors, since the correction system is sensitive to phase. For operation without indexing errors therefore, it is desirable to detect error signals in a form which can be amplified in a low-frequency, narrow-passband color correction circuit. In this manner the desired gain may be provided in amplifier circuits of the color correction system without introducing indexing errors because of noise of phase distortion possible in wide-band amplifiers.

It is, accordingly, a general object of the present invention to provide improved color indexing apparatus.

Another object of the invention is to provide color indexing systems free from the effects of video luminance level contamination.

Further it is an objective of the invention to provide an indexing system which requires low level amplification of only relatively slowly varying indexing control signals.

A color television system embodying the invention therefore includes a cathode ray color picture tube with a screen comprising parallel red, green and blue color emitting phosphor stripes arranged in recurring color triplets. The cathode ray beam produces light of a particular color depending upon the characteristic of the phosphor at the position on the screen to which the beam is directed. To assure that the desired color is always produced from the color video signals, a color servo loop is provided to modulate the beam with video signals of a particular color at the same time light of that color is produced by the screen. Therefore the beam, at any position on the screen, is modulated with the video signals of the desired color.

In accordance with the present invention, the color servo loop provides a slowly varying direct current indexing control signal at the lowest level. This is effected by using photocell light detectors in a phase comparison circuit to compare the phase of a reference oscillator waveform with that of a periodically recurring light signal from the phosphor stripes. The reference oscillator is used also to synchronize a circuit for sequentially switching video signals of different colors to modulate the cathode ray beam. Thus any phase variations detected by the photocells indicate a departure of the color of the reproduced light from the color of the video signals with which the beam is modulated. Because of continuous correction action of the color servo loop, the instantaneous variations during operation of the indexing system are small and the band-width required for passing the detected variations is narrow. Amplification of the detected low level phase variations therefore is afforded in a narrow-band, low-frequency amplifier circuit with little phase distortion or effect of noise components lying outside the passband, and with high gain. The amplified control signals actuate an automatic phase control circuit connected with the reference oscillator. Thus the oscillator phase is automatically corrected in a direction causing selection of video modulation corresponding to the color of the light instantaneously produced by the beam.

Other objects and features of advantage of the present invention will be found throughout the following specification and accompanying drawing in which.

Figure 1:
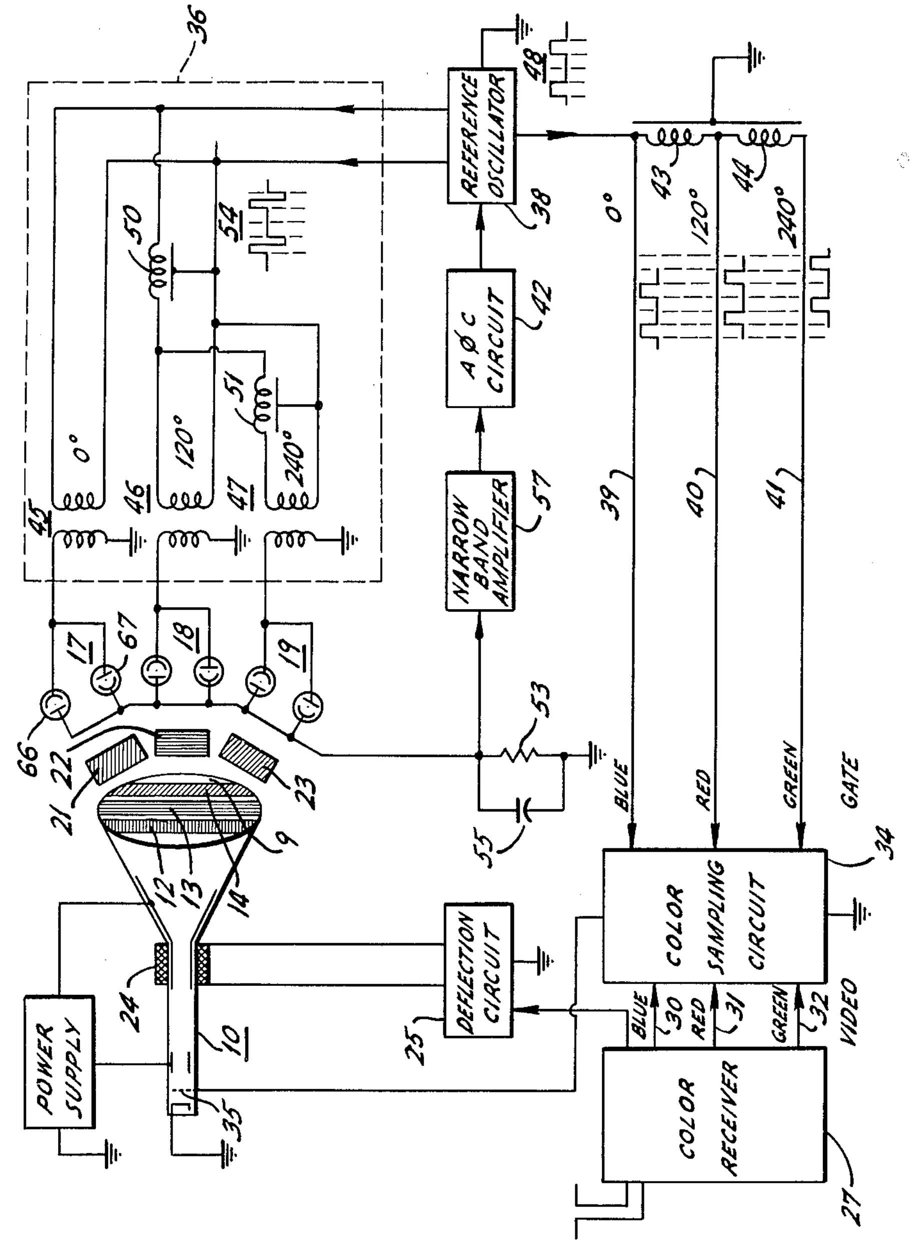
Fig. 1 is a combined block and schematic circuit diagram of a color television system embodying the invention.

Throughout the drawings like reference characters are used to designate similar component parts to facilitate comparison between the different views. Those features which are well known in the art, and whose details are not a part of the present invention, are shown in block diagram form more readily to point out the nature and construction of the present invention.

The circuit diagram of Fig. 1 illustrates a typical color television indexing system operable in accordance with the teachings of the present invention. Color pictures are displayed by the directly viewed color phosphor screen 9 of a single gun cathode ray beam color tube 10. Picture elements of the different primary colors are reproduced in different color zones represented by the vertically oriented blue, red, and green stripes 12, 13 and 14. The stripes are enlarged for clarity but represent a plurality of fine, closely-spaced lines which the human eye may merge into a continuous color picture. Three sets of paired photocells 17, 18 and 19 are provided respectively for response to light of each of the primary colors produced by the corresponding phosphor stripes 12, 13 and 14. Different colors are selectively filtered from the color picture on the screen for this purpose by the respective red, blue and green monochromatic filters 21, 22 and 23. The photocells each have viewing angles subtending the entire screen to assure control at all beam positions. Individual color stripes are excited by the beam as it is positioned by the deflection yoke 24 and scanning circuit 25 to impinge upon corresponding color zones.

Video signals from a television transmitter are reproduced in the color receiver 27. In this embodiment the video signals are separated into three simultaneous primary color video components at the receiver output leads 30, 31 and 32. The resulting red, green and blue video color signals then serve as one set of input signals for actuating the color sampling circuit 34. Sampling is effected in the well known manner by driving the control electrodes of three separate color gating tubes with the corresponding three color video signals and gating each of the colors in time sequence by a second set of three sequential gating input signals respectively supplied to another control electrode of each tube. The gating signal is derived from the reference oscillator 38 with a frequency such that the color tube beam is periodically intensity modulated at control grid 35 by a particular color video signal at the time the beam is periodically deflected to a stripe of the same color. Although the color phosphors need not be in the form of vertical stripes, the circuits are simplified when the phosphors are laid out in a periodically recurring pattern of stripes such that the reference oscillator 38 serves to periodically gate the video color signals in a sequence corresponding to the recurring color pattern of the phosphors impinged upon by the beam as it is scanned in a geometric pattern across the screen 9 at a substantially constant speed.

Since the colors are laid out in repetitive sequences of equal color areas on the illustrative vertically ruled line color tube screen 9, the output signals of the reference oscillator 38 may be conveniently delayed at the three gating leads 39, 40 and 41 by equal phase angles of 120°. This is effected by operation of the delay lines 43 and 44. The video signals applied to the color sampling circuit 34 therefore are sequentially gated to appear in a blue, red, green color sequence at the picture tube control grid 35. With the illustrated vertically oriented stripes, the reference oscillator will operate at a frequency of about seven megacycles per second with a duty cycle of 33% to provide the waveform 48 so that each color is gated on for a complete color element period of $$\frac{1}{7\times 10^6}$$

second during each sampling oscillator cycle. By varying the phase of the reference oscillator output signals with the automatic phase control circuit 42, the relative timing of the color video signals and the corresponding colored light may be altered. Therefore the oscillator phase is controlled to automatically index the color video signals in response to the color of light produced instantaneously by the beam as it impinges upon the picture tube screen 9.

In accordance with the present invention, a pair of photocells is provided responsive to each color and connected in a phase comparison circuit to provide a low level indexing signal containing only low-frequency variations from a fixed phase relationship. Each photocell is primed by the reference oscillator driving signal 54 to conduct in response to light produced during the period that the beam is expected to impinge upon a stripe of a color to which the photocell is responsive. This occurs because the photocells are supplied with operating potentials developed by transformers 45 to 47 at the reference oscillator frequency. Thus two high-frequency signals, comprising the colored light recurrence frequency and the separate electrical phase comparison driving signal for the photocells, obtained from the reference oscillator 38, are compared directly by conduction of the two photocells in each set in opposite sense during respective half cycles of the alternating oscillator waveforms 54. A resultant low-frequency signal, indicating only variations in phase of the two signals is developed at resistor 53 from the combined current of each of the photocell sets 17, 18 and 19.

The high frequency signal and noise components are by-passed by capacitor 55 to provide only direct current indexing signals for amplification in the narrow-band, low-frequency amplifier circuit 57, wherein high gain may be afforded without introducing phase distortion. Because of the improved sensitivity, the indexing system efficiency is increased and the cost of the system is decreased, while at the same time the performance is improved because of greater signal levels and less phase distortion.

The oscillator 38 provides gating signals for both the color sampling circuit 34 and the photocells 17 to 19 when the system is properly indexed such that a fixed phase relationship is established between signals derived from the color of reproduced light and signals switching the color of the video signal modulating the picture tube grid 35. The phase angle magnitude is determined by the electrical characteristics of circuit components such as the photocell driving transformers 45 to 47 and associated delay circuits 50 and 51. As will be explained more fully hereinafter in connection with Fig. 2A, a fixed phase angle other than zero between the two referenced signals is desirable in some cases to provide advantageous operating conditions.

Each set of paired photocells 17 to 19 is connected in a phase comparison circuit to reproduce signals which are a function of the variations from the normally fixed phase relationship established between the driving signal from reference oscillator 38 and the recurrence frequency signal of light produced by the picture tube screen 9. These signals represent only the low-frequency variations of phase due to scanning speed nonlinearities and the like. The resistor 53 is by-passed by capacitor 55, and the time constant of the resulting R–C network is chosen to be as great as possible while still allowing the oscillator to follow the low-frequency color phase variations. In general, therefore, the control signal will be a varying direct current which has high-frequency noise and signal components filtered out by the capacitor 55.

The indexing signal at resistor 53, which is the sum of the resultant phase departure signals reproduced by the three photocell sets 17 to 19, is preferably chosen to have a zero mean control potential when the sampling oscillator and reproduced colored light signals are at the correct phase difference. Any variations of operating potentials in the indexing circuits will then have less tendency to change the position at which the indexing servo system will be locked in, than if it were at a potential which must be maintained by fixed circuit conditions and which therefore might vary with line voltage fluctuations or the like. This is accomplished by choosing the fixed phase difference between the two comparison signals, when the colors are properly indexed, such that the photocells of a paired set conduct the same average currents in opposite senses during alternate halves of the driving cycle 54 when they are active. Therefore variations of phase in either direction will provide a sensed electrical variation about a locked in null position.

Brightness variations of the light will serve to vary the photocell output potential and thus will change the amplitude of the control signal developed in the servo loop, but because of the null position a brightness variation will not affect the zero potential of the lock-in position. As the light becomes brighter, the amplitude of correction signals developed in the servo loop becomes greater to effect a more rapid index correction, which is desirable since color errors are more noticeable to the eye in a brighter color picture.

Preferably, in order to assure control during blackened out portions of the reproduced picture, the photocell sensitivity should be enough so that there is some degree of control response in the servo loop to the light produced by beam impingement upon a color stripe when a minimum residual "black" signal not seen by the eye is provided. This will prevent the color phase from departing substantially from the correct value at any time, and will prevent color fringing at the edges of black areas which might be caused during the time it would take the system to lock-in. This is particularly desired when a single set of photocells is used for a single color as large areas of the picture might be devoid of the color to which the indexing system is responsive.

So long as any residual brightness information is present, the single set of photocells responsive to the color component present will afford a correction signal. Thus control is assured so long as the reproduced picture contains a little of the color to which the photocell set is responsive. However, three sets of photocells for the three corresponding colors are preferably used to provide more rapid control action afforded by a system responsive to the presentation of each color, rather than to a single color of each color triplet. The maximum sensitivity also is substantially increased by addition of the control potentials produced by the different photocell sets.

Figure 2:
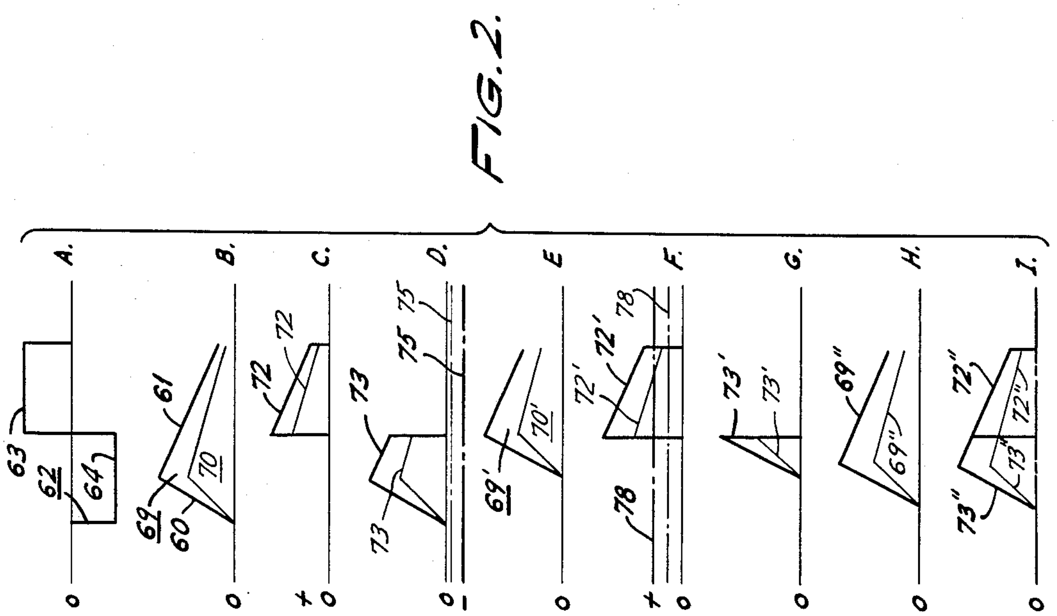
Fig. 2 is a waveform chart illustrating control characteristics afforded by the invention.

For a more detailed description of the control action, consider operation of the phase comparison circuit of Fig. 1 along with the illustrative waveforms of Fig. 2. Simplification of the explanation is afforded by idealizing the illustrative waveforms and by considering operation of a circuit utilizing a single paired set of photocells. The reference oscillator gates the alternate photocells of the pair to conduction with the respective excursions 63 and 64 of a waveform of unity amplitude, such as the square wave 62 of Fig. 2A.

Sawtooth waveform 69 of Fig. 2B represents the idealized response of the photocell to reproduced light of a particular amplitude when continuous operating potential is applied to the photocell. Leading edge 60 of this waveform results as the beam starts across a color phosphor stripe, building up to maximum amplitude as the beam fully impinges upon the stripe. Trailing edge 61 represents phosphorescence occurring with a linearized decay after the beam has left the maximum brightness condition.

The driving waveform 62 of Fig. 2A is used to drive the two photocells 66 and 67 of Fig. 1 into alternate conduction during the period in which blue video signals are gated at the picture tube grid 35. If no blue light is produced during the photocell driving period, the photocells 66 and 67 will conduct equally and in opposite directions so that the resultant current at resistor 53 will be zero. However, during the photocell drive period, the photocells 66 and 67 in addition will be responsive to such blue light as may occur. Any differences in the quantity of blue light emitted during the two periods at which the portions 62 and 63 of the oscillator waveform are presented will cause photocells 66 and 67 to produce a resultant current which is not zero. This resultant current flow therefore will change as the phase relationship between the light reproduction waveform 69 and the driving waveform 62 is altered. Consider first this action in the presence of a typical blue light signal represented by the thick line waveform 69 of Fig. 2B. It is seen that the areas 72 and 73 of Figs. 2C and 2D respectively are representative of linear multiplication of the two waveforms 62 and 69 obtained by conduction of the two photocells 66 and 67 during their respective gating periods. The algebraic sum of these areas averaged over the entire period is representative of the potential developed by integrating the current flowing through resistor 53. For the waveforms shown in Figs. 2C and 2D, the algebraic sum results in a negative direct current signal level 75. The direct current signal level is therefore a function of the phase angle between the periodically recurring components of the electrical excitation signal 62 and the photocell response signal 69.

The phase of the blue light response signal is changed with respect to that of the sampling signal by scanning speed variations. A signal of different phase is illustrated by the waveform 69' of Fig. 2E. It is seen that a positive resultant direct current signal level 78 of Fig. 2F is obtained by integrating the areas of waveforms 72' and 73' of Figs. 2F and 2G in the same manner. By choosing the phase of the sawtooth waveform at some position between the two described phase relationships of Figs. 2B and 2E, the resultant integrated signal response of the photocells will be zero. This phase relationship is indicated by the further waveform 69" of Fig. 2H. The integration process illustrated by Fig. 2I, where the waveform 72" has an area equal to that of waveform 73", results in zero potential. Thus the normal operating point at which the servo loop is locked in may be conveniently chosen as zero. The sense or polarity of the resultant control signal with reference to zero potential therefore indicates the direction of phase departure of the output signal developed in response to the blue light from the nominal phase angle of waveform 69". This information may be used to correct for color errors by retarding or speeding up the oscillator phase until the null position is reached. Although specific idealized waveform shapes have been used to illustrate the operation, the same general action will be maintained with substantially different waveforms.

In like manner, the same control action described for the particular set of photocells 17 will be effected for each of the other colors by the corresponding sets of photocells 18 and 19, so that the total control potential at resistor 53 will be additive result of the three developed signals.

As indicated by a similar analysis of the thin line waveform 70 of Fig. 2B, indicative of the blue light of a reduced brightness level, the only effect of changes in brightness level will be corresponding changes in the amplitude of the resultant control signals 75 and 78. Thus, with the lower amplitude of the reproduced color light wave 70, there will be a corresponding decrease of areas of the waveforms 72 and 73. Accordingly the color indexing signals 75 and 78 will also be reduced in amplitude. The mean control position, however, will still be maintained at zero potential since the areas of waveforms 72" 73" in Fig. 2I remain equal. Therefore no change of sense results and the brightness level does not affect the lock-in position of the oscillator.

Figure 3:
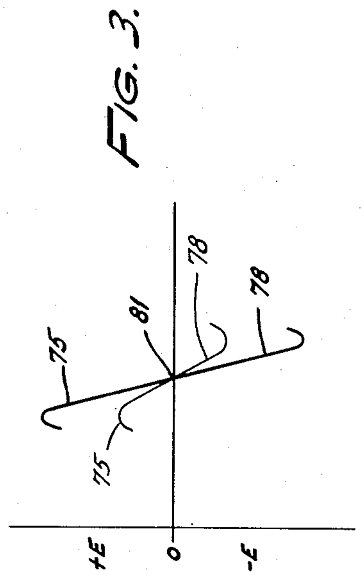
Fig. 3 is a graph illustrating the effect of amplitude upon a phase detector constructed in accordance with the invention.

This action may be illustrated by the usual phase comparator response characteristics of Fig. 3, where a difference in the amplitude of the brightness represented by the relative positions of the two curves results only in the change of amplitude of the control signal and not in a shift of the cross-over position 81. In operation, any suitable phase comparison technique with this type of characteristic may similarly be utilized to advantage in the servo loop for controlling the oscillator phase to correct for phase departures. Although generally the oscillator control circuit 42 is indicated as a phase control circuit, it is noted that either the frequency or the phase of the sampling oscillator 38 may be controlled to correct for differences of phase between the two signals derived respectively from the sampling oscillator waveform, serving to gate the video color signals in sampling circuit 34, and the corresponding signals derived from the light reproduced by the phosphor stripes on screen 9.

Figure 4:
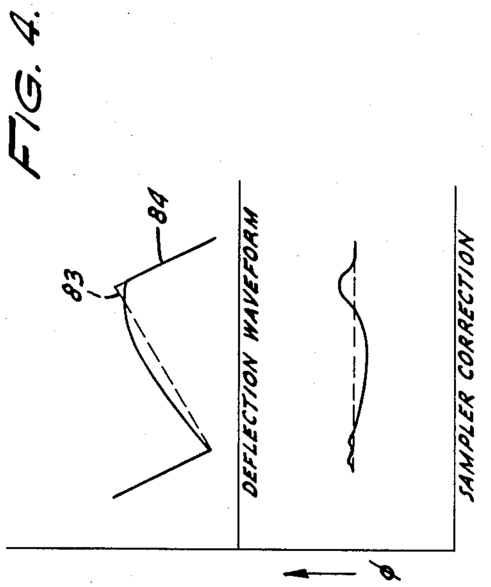
Fig. 4 is a graph illustrating operation of the invention in automatically correcting color errors caused by deviations of the beam position due to changes in the beam scanning speed.

In general, the band over which the control is effective is sufficient to correct for variations, shown in Fig. 4, from the optimum deflection linearity of dotted waveform 83 as illustrated by the typical deflection sawtooth waveform 84. It may be assumed that deflection linearity will not vary at a rate faster than substantially ten times the basic deflection frequency. Thus a servo loop which follows variations up to about 150 kilocycles per second will be sufficient to provide continuous oscillator correction control under any reasonably expected conditions due to changes in horizontal deflection circuits operating at 15,750 cycles per second. Even though the range of variation in the recurrence rate of vertical color stripes may be of the order of two megacycles, as hereinbefore explained, control throughout the 150 kilocycle range is sufficient to keep the video color sampling circuit in step with the light produced by the color stripes. Therefore the necessary bandwidth is considerably reduced by the present invention.

Certain variations of the illustrative embodiments may be used without departing from the principles of the invention. For example, the oscillator may be connected to excite the photocells continuously in a different manner, as hereinafter discussed. Also other phase comparator circuits may be utilized, where desired. In any case, however, the photo responsive elements are connected as the active elements of the phase comparator circuit.

Figure 5:
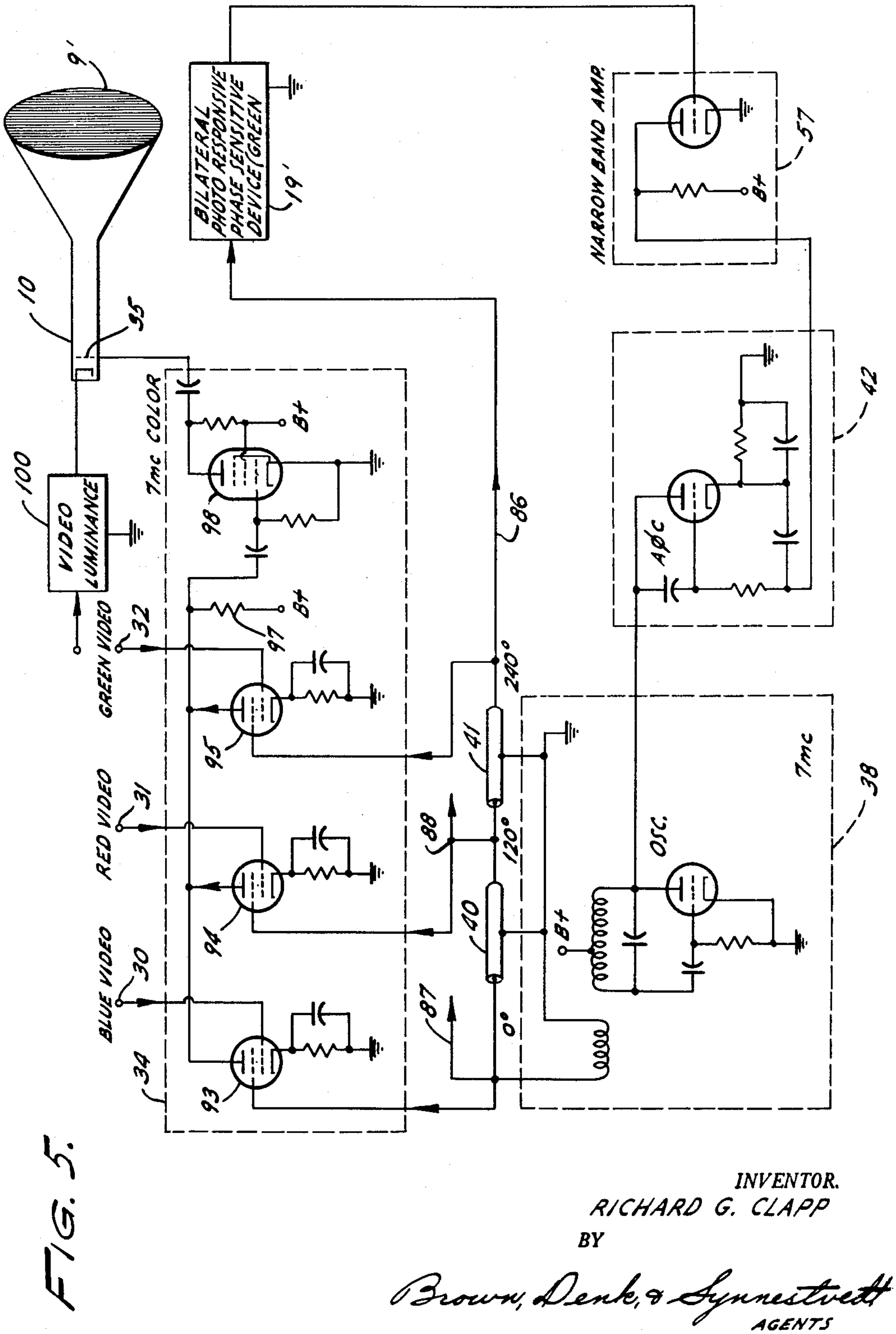
Figs. 5 to 7 are combined schematic and block circuit diagrams of further color television systems embodying the invention.

A vertically ruled line screen system having a seven megacycle recurrence frequency for each color is shown schematically in Fig. 5. Thus the plurality of red, blue and green ruled line color triplets, represented schematically by the heavy labeled lines on the screen 9', may be referenced by the oscillator 38 having a frequency of seven megacycles. A single bilateral photo responsive phase sensitive device 19' is excited into periodic conduction by oscillator 38 when green light is reproduced on screen 9'. The photocell excitation waveform from oscillator 38 is obtained from lead 86 of delay line 41 in the same phase that the green video signals are sequentially presented to the picture tube grid 35. It is preferable, if the extra circuit cost is warranted, to provide separate phase detectors for each of the colors. These may be driven in the proper phase from the respective ends of the delay line 40 designated at leads 87 and 88. It is not necessary, in all cases, to provide duplicate delay lines for the photocell exciting signals and the color sampling signals, as shown in Fig. 1. Thus, the two waves are referenced in the same phase, as shown in Fig. 5, and signals from the single delay channel are made both to excite the photo device 19' and to actuate the color sampling circuit.

Simultaneous color video signals are applied at terminals 30 to 32 to excite one control grid of each of the three sampling tubes 93, 94 and 95. The combination of this video signal with the phased oscillator signals from delay lines 40 and 41 at another control grid of these sampling tubes provides a color video signal at the anode for sequentially actuating the color tube 10 with video signals of different colors. The anodes of each sampling tube are coupled to a single load resistor 97 to present the phased color video signals for coupling by amplifier tube 98 to the single control grid 35 of the color tube. Separated picture luminance and color video signals may be used in this system. Thus the color tube cathode is modulated with the video brightness signals of circuit 100.

Figure 6:
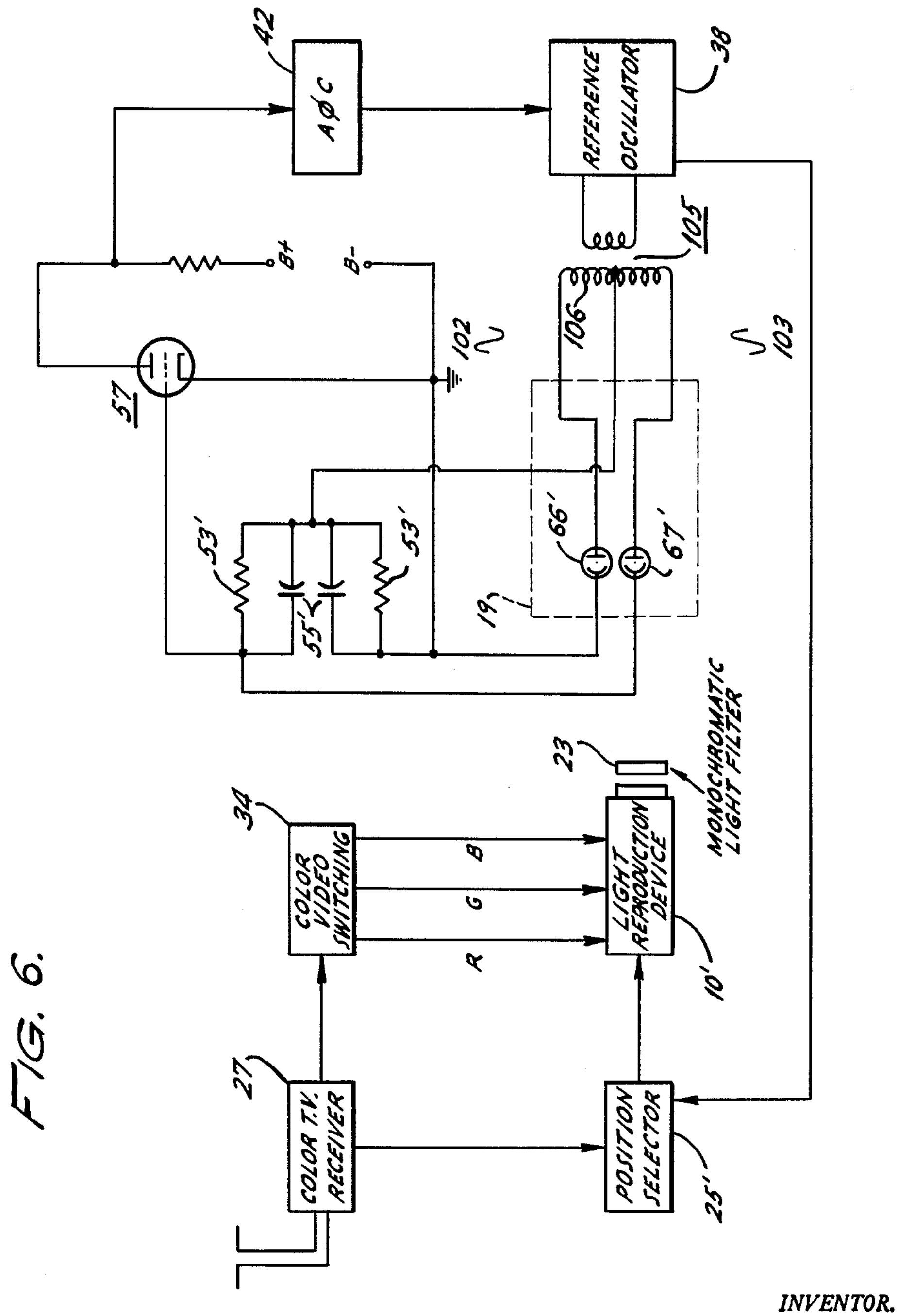

A further embodiment of a color television indexing system is illustrated in the simplified block circuit diagram of Fig. 6. The reference oscillator 38 operates in the manner hereinbefore described to provide a signal for driving two photocells 66' and 67' into conduction only on the positive signal excursions represented above the photocell conduction level lines shown in the waveforms 102 and 103. By means of transformer 105, the oscillator signal phase is plit so that the photocells 66' and 67', connected in the same sense, may be excited on opposite halves of the oscillator cycle. Similar electrodes of the photocells are thereby connected to opposite ends of the center-tapped secondary winding 106. Two signal developing resistors 53', and accompanying by-pass capacitors 55', are connected in series between the grid and cathode of amplifier tube 57 to afford the desired indexing control signals.

Figure 7:
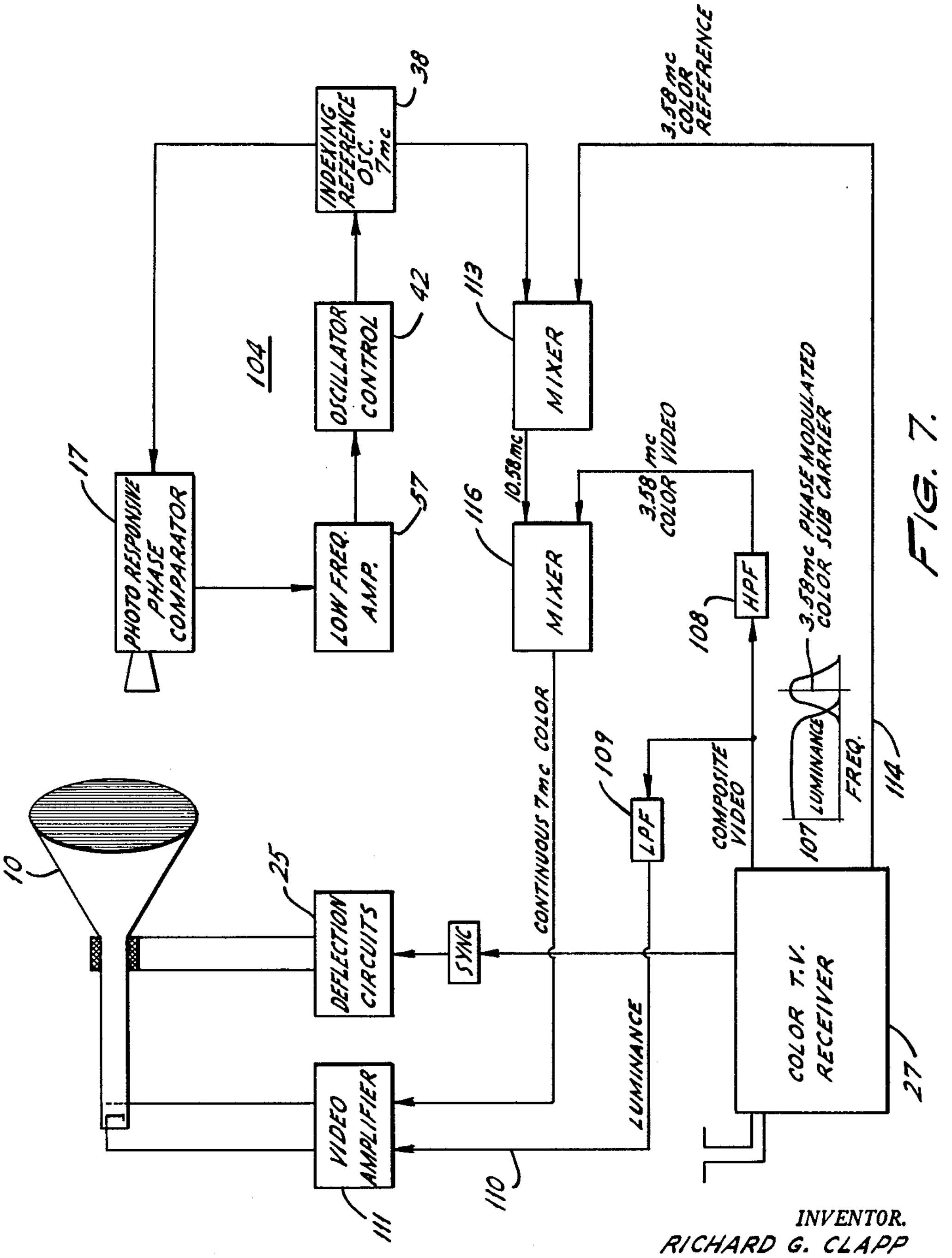

In the further embodiment of Fig. 7, color tube 10 and oscillator servo loop 104 is shown. The remaining portions of this system are described in connection with a television signal of the type shown by the accompanying graph 107. The video signal luminance component is separated from the phase-modulated color subcarrier component by means of low pass filter 109, and is applied to the color tube 10 by way of lead 110 and the video amplifier 111. The color signal is isolated by high pass filter 108 and is introduced to the video amplifier circuit 111 by way of mixer circuit 116 which converts the 3.58 megacycle subcarrier to a seven megacycle subcarrier corresponding to the color recurrence frequency of the vertically-lined color tube 10.

Since the color information must be synchronized with the transmitter, a first mixer 113 is provided to reference the color signals with the incoming 3.58 megacycle color subcarrier reference signal at lead 114. This reference signal is derived from a burst signal incorporated with the horizontal synchronizing pulses in transmitted signals of the type described. Mixing action of the 3.58 megacycle color reference signal and the color indexing signal from oscillator 38 in circuit 113 results in a 10.58 megacycle wave. This wave is therefore synchronized with both the indexing reference oscillator 38 and the transmitter color reference signal. The second mixer circuit 116 heterodynes the 10.58 megacycle wave with the incoming 3.58 megacycle phase modulated color subcarrier information from the high pass filter 108. As a result, the desired seven megacycle signal is produced to excite each color phosphor with a corresponding color video signal as the beam is deflected thereto by the synchronized deflection circuit 25. Color sampling is effectively accomplished at the tube screen by means of the stripes of different colors, which emit light in time sequence as the beam is scanned at constant speed across the stripe. In this system also, the indexing reference oscillator 38 controls the color indexing action by comparing the phase of the seven megacycle photocell driving signal with that of the reproduced light signal to index the color signals in the same manner as in the other embodiments.

It is clear, from the various embodiments of the invention disclosed and their modes of operation, that an indexing system is provided which may be practically used to effect color indexing with a great variety of color tubes and systems. By means of the invention, the color indexing signals may be produced at low-frequency because of phase comparison at the photocell light detector level. This results in a practical, workable system which is not responsive to the amplitude of the video brightness components and is, therefore, substantially free of video contamination due to this cause. Those features which are believed indicative of the nature and scope of the invention are defined with particularity in the following claims.

I claim:

1. In a color television indexing system including a cathode ray television tube having an array of targets individually designated for reproduction of different colors and arranged for excitation by the cathode ray beam at different beam positions, and means connected for both modulating and scanning the beam periodically across the targets in synchronism with a source of color video signals; the improvement comprising, color sampling means including an oscillator connected for exciting the beam periodically with varying video signals representing particular colors as the beam is directed to target positions designating corresponding colors, bilaterally-conductive color-responsive photocell means responsive to the light produced by impingement of the beam on designated targets, electrical driving means for synchronously exciting said photocell means in a fixed phase relationship with respect to said oscillator at the sampling frequency, and means connected for controlling the oscillator phase with resultant signals derived from the photocell means in response to changes in phase of reproduced colors with respect to the electrical excitation from said oscillator, the control of the oscillator being in such sense to direct the sampling means to excite the beam with only those video signals representing the color corresponding to that of the target to which the beam is directed.

2. In a color indexed television system including a beam color tube, means for deflecting the beam of the tube to different color reproduction zones, and means connected for modulating the beam with color video signals including a video color sampling circuit and an oscillator circuit for driving said color sampling circuit; the improvement comprising, dual-element photo responsive means for individually detecting reproduced signals in at least one of said color zones, means connected for differentially energizing said photo responsive means in synchronism with the color sampling circuit to produce a resultant detected signal indicating variations of indexing of the beam with different color zones with respect to the video sampling periods for the corresponding colors, and oscillator control means responsive to said resultant detected signal to control the oscillator phase and maintain the sampled video color signals in properly indexed relationship with corresponding color zones.

3. An indexed color television system comprising in combination, a color tube having a beam adapted for deflection to a plurality of different color zones, sampling means connected for modulating the beam sequentially with separate video color signals synchronously with its deflection to corresponding ones of said color zones, a reference oscillator connected to the sampling means to establish the frequency of sampling the modulation of said beam with the different color video signals, dual-element detector means connected for excitation by light of a particular color reproduced by said tube, means for electrically exciting said detector means differentially with a signal from said reference oscillator, and phase control means actuated by resultant signals produced by said detector means from interaction of the light and electrical signal components connected for automatically controlling the oscillator phase in such sense that color registration errors are minimized.

4. A color indexing system comprising in combination, dual-element detector means responsive differentially to light of one color only in pictures reproduced from electrical color signals, sampling means connected for sequentially reproducing picture light components of different colors, oscillator means connected for synchronously driving both said detector and sampling means in a fixed phase relationship, and oscillator phasing control means connected for indexing the reproduced light color with the corresponding electrical color signals in response to resultant signals produced in said detector means from the reproduced light and the oscillator drive signal.

5. A color indexing system for a television receiver, comprising, means including an oscillator connected for detecting separate color video signals from a combined signal having a phase modulated color subcarrier, means for reproducing light of corresponding colors from the detected color video signals, dual-element photo detection means electrically conditioned for differential actuation by reproduced light of one color only, a phase comparison circuit including the photo detection means for developing output signals which are a function of phase variations between the detected light and the oscillator signals, and means connected for correcting color errors in response to output signals from the phase comparison circuit.

6. A color indexing system for a television receiver, comprising beam color tube, means for directing the beam to different color zones in response to sequentially presented color signals, a pair of unilaterally conductive photocells for detecting reproduced light from one only of said color zones, reference oscillator means connected for both controlling the color video signal sequence and electrically priming said photocells in differential sense for alternate conduction and non-conduction in response to reproduced light to produce in said detecting means resultant signals, and means responsive to the resultant signals connected for controlling the oscillator phase to thereby automatically correct for color errors.

7. A system as defined in claim 6 wherein a fixed phase relationship is established between the color video sequence signals and the priming signals during proper color reproduction at such an angle that a zero direct current error detection signal results when the phase relationship is held at that angle.

8. A system as defined in claim 6 wherein the means for detecting light comprises a pair of asymetrically conducting photo responsive cells connected as active elements in a phase comparison circuit for providing said resultant signals.

9. A system as defined in claim 6 wherein the means for detecting light is connected to provide resultant signals which are substantially the product of the waveforms of the reproduced light and the electrical priming signals applied thereto.

10. An indexing system for a color television receiver comprising a pair of photocells, a picture reproducing device having a striped color screen and a scanning beam for sequentially exciting said stripes to emit light of different colors, means for causing said photocell to be responsive to light from stripes of one preselected color only, means for electrically priming the photocells alternately for conduction in time sequence when the scanning beam is conditioned to excite stripes of said preselected color, and means directed by photocell output signals and operative on said electrical priming means to correct color reproduction errors.

11. A color television system comprising in combination, a source of composite electrical signals for reproducing color pictures, a cathode ray picture tube for producing light of different colors at different cathode ray beam positions, means to deflect the beam to beam positions for different colors in synchronism with said signals, means for intensity modulating the beam with at least a portion of said signals, a pair of photoelectric cells, means for differentially applying energizing potentials to said photoelectric cells at a recurrence rate related to that of predetermined components of said signals, optical filter means selectively admitting to both said photocells light of one preselected color only developed by said tube in response to said predetermined signal components, means developing a control signal from said photoelectric cells, and means responsive to said control signal for controlling said recurrence rate.

12. A system as defined in claim 11 wherein said composite electrical signals comprise separate sets of video signals representing intelligence of different colors.

13. A system as defined in claim 12 wherein said predetermined components comprise said separate sets of video signals, and means are provided for sequentially modulating said beam with said predetermined components at a rate synchronized with said recurrence rate.

14. In a color television receiver, a cathode-ray tube adapted to reconstitute televised images in color, said tube having a screen comprised of a multiplicity of sets of parallel phosphor stripes of different color characteristics, each set having a predetermined color sequence, means for scanning the cathode-ray beam of said tube transversely of said stripes, color sampling means including a reference oscillator connected to excite said beam sequentially with video signals representing different predetermined colors as said beam is scanned transversely of said phosphor stripes, a pair of photoelectric elements responsive to the light of one only of said colors, means energizing said photoelectric elements from said reference oscillator in alternate phase relation, a load circuit common to said photoelectric elements for developing from the combined output of said pair of elements an error signal indicative of the relative time deviation between the impingement of said beam on a phosphor stripe of said color and the excitation of said beam by a video signal representative of said color, and means responsive to said error signal for adjusting the phase of said oscillator in a sense to reduce said deviation.

15. The combination claimed in claim 14, wherein filter means are provided for substantially eliminating, from said error signal, frequency components of the order of the frequency of said reference oscillator.

16. The combination claimed in claim 14, wherein filter means are provided for limiting the bandwidth of said error signal to a band extending from zero cycles to a frequency of the order of ten times the frequency of said cathode-ray-beam scanning means.

17. In a color television receiver, a cathode-ray tube adapted to reconstitute televised images in color, said tube having a screen comprised of a multiplicity of sets of parallel phosphor stripes of different color characteristics, each set having a predetermined color sequence, means for scanning the cathode-ray beam of said tube transversely of said stripes, color sampling means including a reference oscillator connected to excite said beam sequentially with video signals representing different predetermined colors as the beam is directed to phosphor stripes of corresponding colors, a pair of photoelectric elements responsive to the light of one only of said colors, a load circuit, means energizing said photoelectric elements from said reference oscillator in alternate phase relation, means connecting said photoelectric elements and said load circuit as a balanced photoelectric phase discriminator for developing across said load circuit an error signal indicative of the relative time deviation between the impingement of said beam on a phosphor stripe of said color and the excitation of said beam by a video signal representative of said color, and means responsive to said error signal for adjusting the phase of said oscillator in a sense to reduce said time deviation.

18. In a three-color television receiver, a single-gun cathode-ray tube adapted to reconstitute television images in color, said tube having a fluorescent screen comprised of a multiplicity of parallel-line phosphor triplets of three primary colors, each triplet being arranged in the same fixed color sequence, means scanning the cathode-ray beam of said tube transversely of said lines in synchronism with the horizontal synchronizing frequency component of a received color signal, color sampling means including a reference oscillator connected to excite said beam sequentially with video signals representing said primary colors as the beam is directed to phosphor lines of corresponding colors, a first pair of photoelectric cells responsive only to light of the first of said primary colors, a second pair of photoelectric cells responsive only to light of the second of said primary colors, a third pair of photoelectric cells responsive only to light of the third of said primary colors, means energizing said pairs of photoelectric cells from said reference oscillator in three-phase relation, the two photoelectric cells constituting each of said pairs being energized in opposite phase relation whereby they are rendered alternately effective to detect light from said screen, a single load circuit common to all six of said photoelectric cells for developing from the combined output of said cells an error signal indicative of the relative time deviation between the generation of light of said colors and the operation of said color sampling means, and means responsive to said error signal for adjusting the phase of said oscillator in a sense to reduce the magnitude of said deviation.

References Cited in the file of this patent

UNITED STATES PATENTS

| | | |
|---|---|---|
| 2,635,140 | Dome | Apr. 14, 1953 |
| 2,657,257 | Lesti | Oct. 27, 1953 |